United States Patent [19]

Tomita et al.

[11] 4,356,621

[45] Nov. 2, 1982

[54] MACHINE TOOL WITH AUTOMATIC TOOL CHANGE

[75] Inventors: Tamaki Tomita, Okazaki; Kenichi Munekata, Kariya; Fumihiko Ohkoshi, Anjo; Toshifumi Hasegawa, Kariya, all of Japan

[73] Assignee: Toyoda Koki Kabushiki Kaisha, Kariya, Japan

[21] Appl. No.: 216,833

[22] Filed: Dec. 15, 1980

[30] Foreign Application Priority Data

Jul. 25, 1980 [JP] Japan ............................ 55-103237
Oct. 29, 1980 [JP] Japan ............................ 55-151640

[51] Int. Cl.³ .......................................... B23Q 3/157
[52] U.S. Cl. .................................. 29/568; 409/232; 409/233
[58] Field of Search ............... 29/568; 409/231, 232, 409/233; 279/8, 82

[56] References Cited

U.S. PATENT DOCUMENTS

| | | | |
|---|---|---|---|
| 3,191,260 | 6/1965 | Jorgensen | 29/568 X |
| 3,520,228 | 7/1970 | Wohlfeil | 29/568 X |
| 3,583,280 | 6/1971 | Hart | 409/233 |
| 3,586,343 | 6/1971 | Reed | 409/232 X |
| 3,603,203 | 9/1971 | Rhodes | 409/232 |
| 3,851,562 | 12/1974 | Tomita | 409/233 |
| 4,008,647 | 2/1977 | Hague | 409/233 X |
| 4,172,683 | 10/1979 | Shimajiri | 409/233 X |

FOREIGN PATENT DOCUMENTS

| | | | |
|---|---|---|---|
| 197811 | 11/1978 | Fed. Rep. of Germany | 409/232 |
| 53-16976 | 2/1978 | Japan | 409/233 |
| 659294 | 4/1979 | U.S.S.R. | 409/233 |
| 742047 | 7/1980 | U.S.S.R. | 409/233 |

Primary Examiner—William R. Briggs
Attorney, Agent, or Firm—Oblon, Fisher, Spivak, McClelland & Maier

[57] ABSTRACT

In a machine tool with an automatic tool change function, a rotatable tool spindle carries a movable key engageable with a key-way formed on a tool. A tool changing arm, serving as a tool support device, friction-rotatably supports at least one tool for selectively inserting and removing same into and from the tool spindle. When a tool change operation is to be performed, rotation of the spindle is changed into a predetermined speed permitting key-engagement. A detecting device is provided for detecting movement of the movable key to confirm engagement of the movable key with the key-way of the tool. A clamp device clamps the tool inserted into the spindle in response to the detecting device. After the tool is clamped on the spindle, rotation of the spindle is changed into a machining speed. A confirming device is provided for confirming that the spindle is reached at a predetermined angular position during rotation thereof. The tool change arm is operated to remove the tool from the spindle in response to the confirming device.

10 Claims, 7 Drawing Figures

MACHINE TOOL WITH AUTOMATIC TOOL CHANGE

BACKGROUND OF THE INVENTION

1. Field of the Invention

The present invention relates to a machine tool with an automatic tool change function, which is capable of making engagement between a key of a tool spindle and a key-way of a tool or a tool holer without stopping rotation of the spindle.

2. Description of the Prior Art

Conventionally, in order to make engagement between a key of a tool spindle and a key-way of a tool, the spindle is stopped at a predetermined angular position.

In order to stop the spindle at such a predetermined angular position, there are required two steps of operations. That is, the spindle is first stopped within a predetermined angular range by controlling a spindle drive motor and then indexed to the predetermined angular position by a mechanical device including, such as, an index plate and an index pin. If the spindle is stopped beyond the predetermined angular range, the spindle drive motor has to be restarted to stop the spindle within the predetermined range. Accordingly, it takes a longer time for stopping the spindle at the predetermined angular position, resulting in a longer tool change time.

Attempt is also made to engage a key of a tool with a key of a tool spindle without stopping rotation of the spindle. However, provision of the key on the tool lacks interchangeability to a standard tool having a key-way, whereby this arrangement is hardly put to practical use.

Furthermore, even if a tool change operation is performed without stopping rotation of the spindle, there is a problem that a large diameter tool with a radially projected cutter has to be returned from the spindle to the tool magazine with its key-way being maintained at a predetermined angular position in order to prevent interference with an adjacent tool in the tool magazine.

SUMMARY OF THE INVENTION

It is an object of the present invention to provide an improved machine tool with an automatic tool change function wherein a key engagement is performed between a key-way of a standard tool and a movable key of the spindle without stopping rotation of a spindle.

Another object of the present invention is to provide an improved machine tool with an automatic tool change function, wherein a tool is returned from the spindle to a tool support device with a key-way thereof being maintained at a predetermined angular position.

Briefly, according to the present invention, these and other objects are achieved by providing a machine tool with an automatic tool change function having a tool spindle rotatably supported and capable of receiving a tool at one end thereof, as mentioned below. Tool support means is provided for rotatably supporting at least one tool to selectively insert and remove the same into and from the tool spindle. A movable key is movably guided in the spindle and has a width smaller than that of a key-way formed on the tool. Means is provided for urging the movable key beyond the one end of the spindle. First control means is responsive to a tool change command for rotating the spindle at a predetermined speed permitting key-engagement. Operating means causes relative movement between the tool support means and the spindle for a tool change operation with the spindle being rotated at the predetermined speed. Detecting means detects movement of the movable key to confirm engagement of the movable key with the key-way of the tool. Clamp means is responsive to the detecting means for clamping the tool inserted into the spindle. Second control means is provided for rendering the first control means inoperative and for rotating the spindle at a commanded machining speed after the tool is clamped relative to the spindle.

In another aspect of the present invention, means is provided for confirming that the spindle is reached at a predetermined angular position during rotation thereof at the predetermined speed. The operating means comprises means responsive to the confirming means for causing relative movement between the tool support means and the spindle in a direction parallel to the axis of the spindle to remove the tool from the spindle.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENTS

Figure 1:
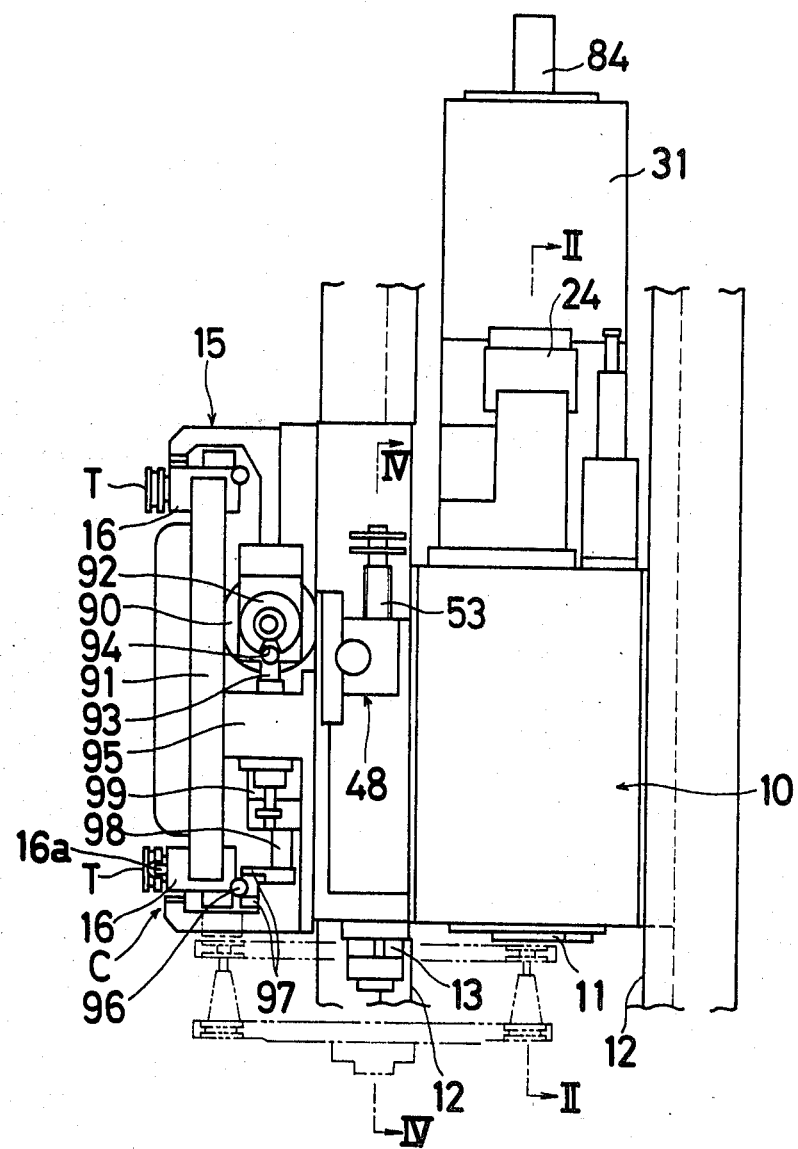
FIG. 1 is a front view showing a spindle head and an automatic tool change apparatus according to the present invention.

Referring now to the drawings, wherein like reference numerals or characters refer to identical or corresponding parts throughout the several views, and more particularly to FIG. 1, there is shown a spindle head 10 which is guided on guide ways 12 and 12 formed on an upstanding column, not shown, for a vertical sliding movement and rotatably supports a vertical spindle 11. FIG. 1 shows an upper end position of the spindle head 10, where a tool change operation is performed. A reference numeral 13 indicates a tool change arm having tool grippers at opposite ends thereof to serve as a tool support device. The tool change arm 13 is movable in a direction parallel to the axis of the spindle 11 and rotatable about a vertical axis. A tool magazine 15 is rotatably supported and carries a plurality of tool sockets 16 on the periphery thereof. Each tool socket 16 removably supports a tool T, and is indexable to a tool change position C, where the indexed tool socket 16 is pivotable from a horizontal position shown in solid lines to a vertical position shown in phantom lines for enabling the tool change arm 13 to change the tools between the vertically oriented tool socket 16 and the spindle 11.

Each tool socket 16 on the tool magazine 15 is provided with a detent pin 16a engageable with a key-way 18 formed on each tool T with some play to restrict the direction of the key-way 18 of the tool T received in the tool socket 16 within a predetermined angular extent. Accordingly, a large diameter tool with a radially projected cutter, as shown in FIG. 2, is prevented from interference with an adjacent tool.

Figure 2:
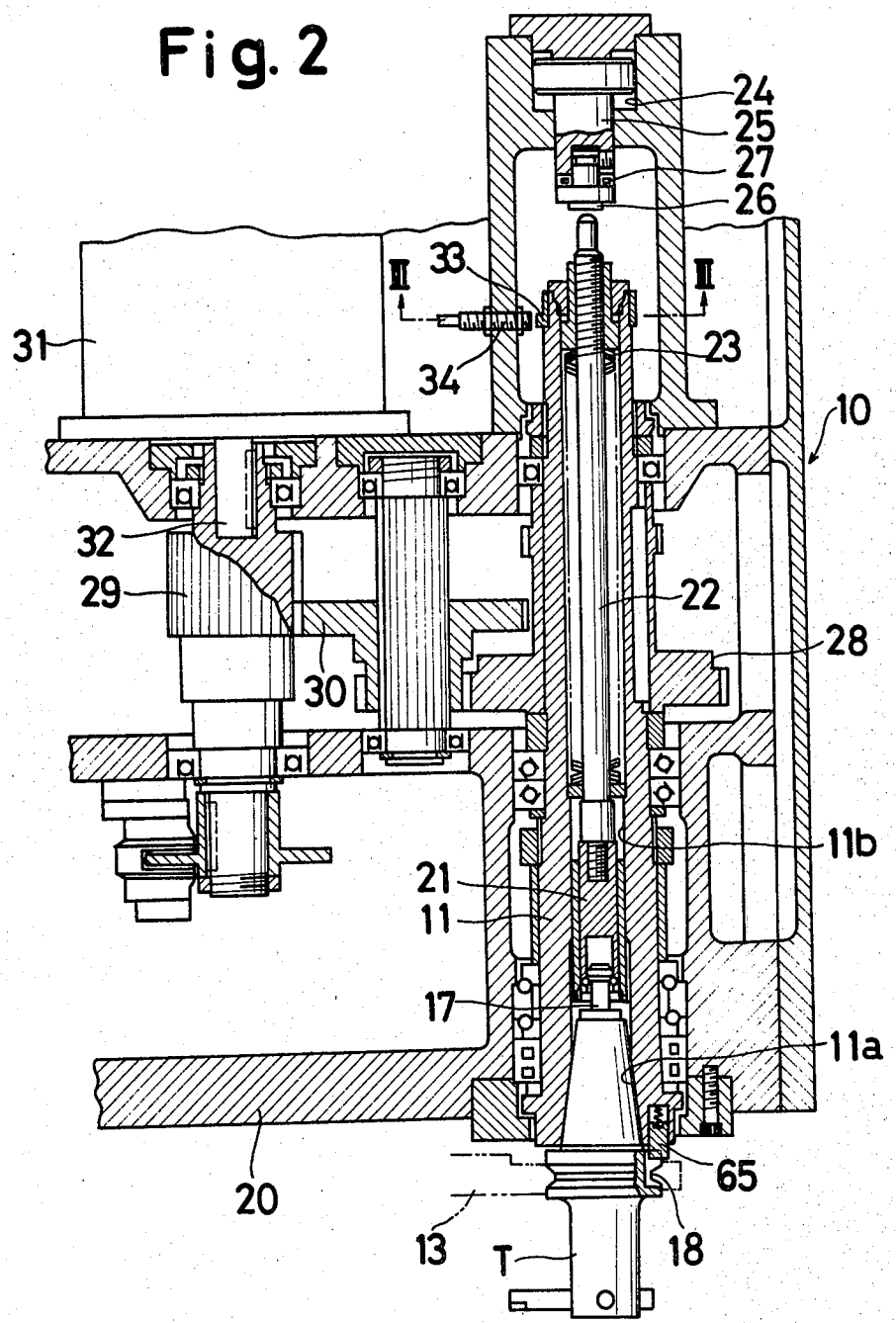
FIG. 2 is an enlarged sectional view taken along the lines II—II in FIG. 1.

Referring to FIG. 2 showing a detailed construction of the spindle head 10, the spindle 11 rotatably supported by a housing 20 is formed with a tool receiving tapered bore 11a at its lower end and a through bore 11b connected to the tapered bore 11a. Within the through bore 11b, there are received a snap member 21 engageable with a pull stud 17 extended from one end of a tool T received in the tapered bore 11a, a drawing rod 22 connected at its forward end with the snap member 21 and projected at its rear end from the rear end of the spindle 11, and a set of washer springs 23 drawing the drawing rod 22 in the rearward direction relative to the spindle 11, in such a manner as to constitute a clamp device for clamping the tool T relative to the spindle 11. In face to face relationship with the rear end of the drawing rod 22, there is disposed an unclamping cylinder 24 whose piston rod 25 rotatably supports an abutting member 26 at its forward end through a thrust bearing 27. When the drawing rod 22 is urged against the springs 23 through the abutting member 26, the tool T in the spindle 11 is unclamped. A gear member 28 is secured on the spindle 11 and is connected through a shiftable transmission gear member 30 and a drive gear 29 to an output shaft 32 of a spindle drive motor 31 which is mounted on the upper end of the spindle head 10. The drive motor 31 is driven at a speed depending upon a rotary speed command applied from a numerical control device NC and also at a predetermined low speed in response to a tool change command, as described later in more detail.

Figure 3:
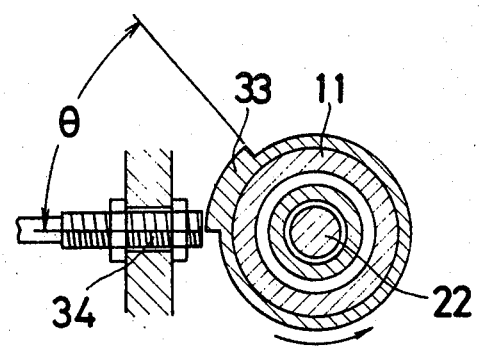
FIG. 3 is an enlarged sectional view taken along the lines III—III in FIG. 2.

At the rear end of the spindle 11 is secured a dog member 33 having a projection with a predetermined angular distance $\theta$, as shown in FIG. 3. A proximity switch 34 responsive to the projection of the dog member 33 is provided on the spindle head 10. When the proximity switch 34 is actuated, it is confirmed that the spindle 11 is reached to a predetermined angular position during rotation thereof.

Figure 4:
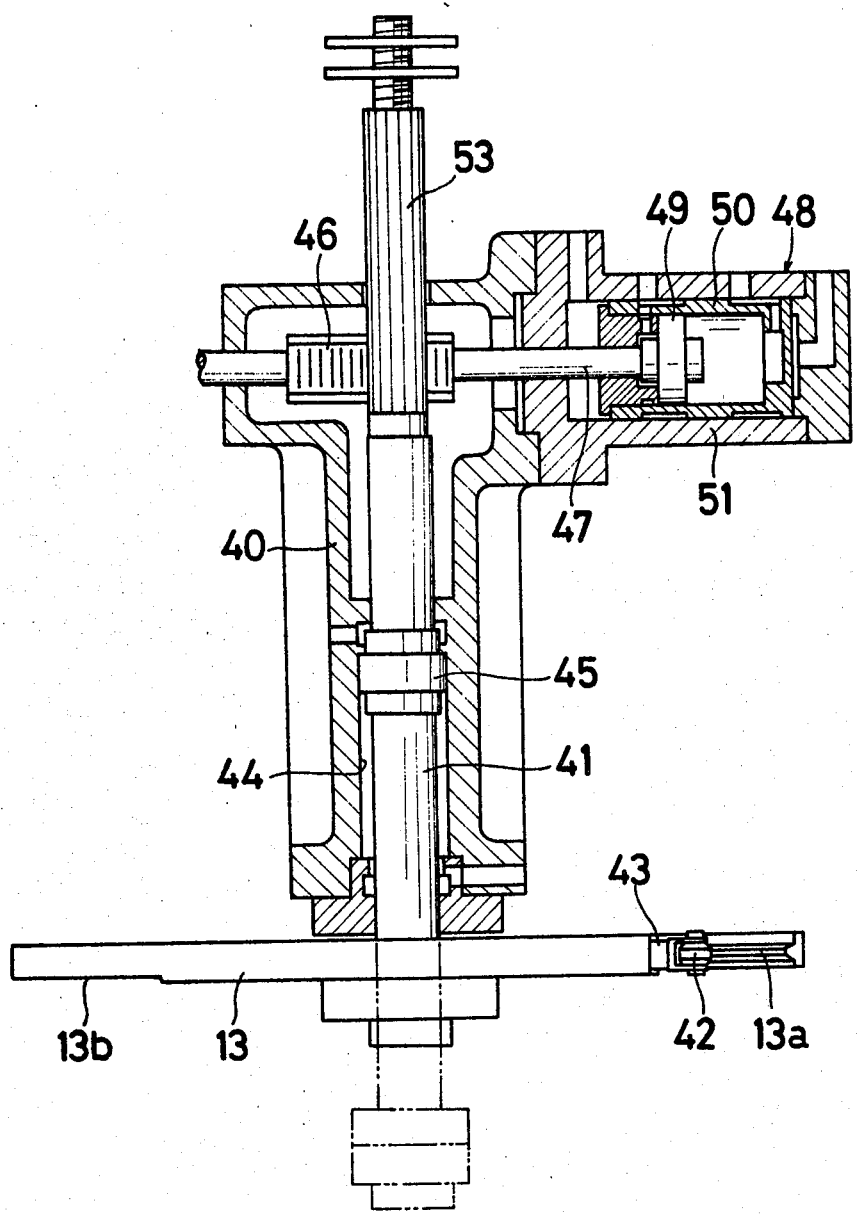
FIG. 4 is an enlarged sectional view taken along the lines IV—IV in FIG. 1.

Referring to FIG. 4 showing a detailed construction of the tool change arm 13 and a drive device therefor, a support shaft 41 is rotatably and axially movably supported by a support body 40. The support shaft 41 has secured at its lower end the tool change arm 13 which is formed at its opposite ends with a pair of circular tool grippers 13a and 13b symmetric with respect to the axis of the support shaft 41 and engageable with a flange portion 37 of each tool T. In order to prevent a tool T from falling from the tool gripper 13a or 13b, a plunger 43 rotatably supporting an engaging roller 42 at its one end is guided at each end of the tool change arm 13 to be movable in a substantially radial direction and is urged outwardly by a spring, not shown. This spring is calibrated in such a manner that when the tool change arm 13 is rotated to grip or release the tools held in the spindle 11 and the tool socket 16 in its vertical position, the plunger 43 is moved inwardly to allow such grip or release of the tool, and when the tools are held by the tool grippers 13a and 13b of the tool change arm 13, the engaging roller 42 is urged toward the tool T to prevent the tool from falling but to allow frictional rotation of the tool.

The support shaft 41 is formed at its intermediate portion with a piston 45 slidably received in a cylinder 44 formed in the support body 40. Selective supply of pressurized fluid into upper and lower cylinder chambers of the cylinder 44 causes the tool change arm 13 to be vertically moved to insert and withdraw the tools T. The support shaft 41 is formed at its upper end with an elongated gear 53 in meshing engagement with a rack bar 46. The rack bar 46 is connected through a piston rod 47 with a piston 49 of a hydraulic cylinder 48 capable of positioning at four positions. The piston 49 is slidably received in an inner cylinder 50 which is, in turn, slidably received in an outer cylinder 51. When the inner cylinder 50 is moved relative to the outer cylinder 51 with relative movement being restrained between the piston 49 and the inner cylinder 50, the tool change arm 13 is rotated between a ready position shown in solid lines in FIG. 1 and a tool grip position shown in phantom lines to grasp or release the tools. When the piston 49 is moved relative to the inner cylinder 50 which is restrained from movement relative to the outer cylinder 51 at its right or left end position, the tool change arm 13 is rotated 180 degrees to change the tools.

As shown in FIG. 1, the tool magazine 15 is provided with an rotary index device constituted by a drive motor 90 connected through a worm and worm wheel mechanism to a circular magazine plate 91, an index plate 92 connected to the drive motor 90 in coaxial relationship therewith, a plunger 93 engageable with an engaging notch 94 of the index plate 92, a hydraulic cylinder 95 for moving the plunger 93 toward and away from the engaging notch 94. Each tool socket 16 pivotably supported on the periphery of the magazine plate 91 is provided at its rear end with an engaging roller 96 engageable with a shifter member 97 at the tool change position C. The shifter member 97 is connected to a piston rod 98 of a hydraulic cylinder 99. When the hydraulic cylinder 99 is operated, the shifter member 97 is moved upward to rotate the tool socket 16 at the tool change position from its horizontal to its vertical position.

Figure 5:
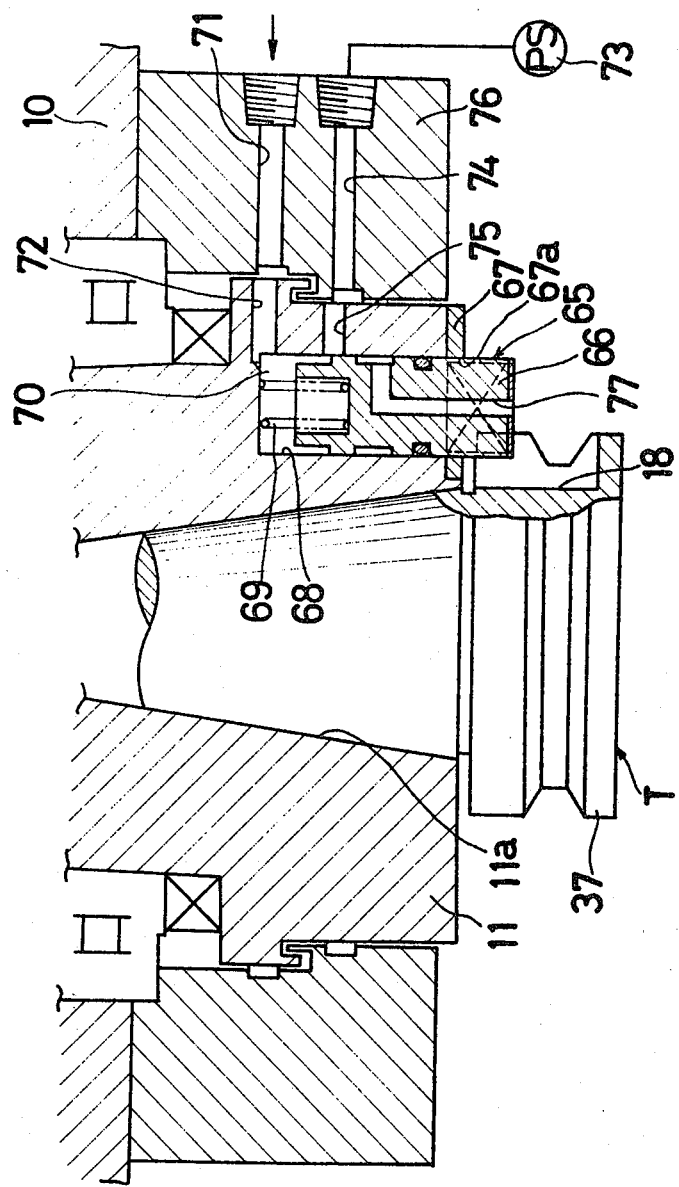
FIG. 5 is an enlarged fragmentary sectional view of a spindle head showing a movable key and a key engagement confirming device.

Referring now to FIG. 5, a movable key 65, engageable with the key-way 18 of a tool T to be inserted into the spindle 11, is slidably received in a bore 68 formed at the front end of the spindle 11. The movable key 65 is provided at its front end with a flattened engaging head 66 whose width is narrower than that of the key-way 18. The engaging head 66 is projected beyond the front end of the spindle 11 through an opening 67a formed on a plate member 67 secured to the front end of the spindle 11. The opening 67a is so formed as to prevent rotation of the movable key 65 and to restrict the forward movement of the movable key 65. A compressed spring 69 is disposed in a rear chamber 70 between the movable key 65 and the bottom end of the bore 68 to urge the movable key 65 forwardly. The rear chamber 70 is always communicated with a pressurized air supply source, not shown, through passages 71 and 72 formed respectively on a cover plate 76 and the spindle 11. The rear chamber 70 is also communicated with a pressure switch 73 through passages 74 and 75 formed respectively on the cover plate 76 and the spindle 11, when the movable key 65 is in its projected position, as shown in FIG. 5. The movable key 65 is formed with a passage 77 whose one end is communicated with an annular groove formed on the periphery of the movable key 65. The other end of the passage 77 is open to the atmosphere at the front end of the movable key 65. When the movable key 65 is moved by the tool T inwardly against the spring 69, the pressure switch 73 is communicated with the passage 77 and thus with the atmosphere. When the movable key 65 is moved by the spring 69 and pressurized air outwardly into a position shown in FIG. 5 as a result of engagement between the key-way 18 of the tool T and the movable key 65, communication between the passages 75 and 77 is shut off, but communication between the passages 72 and 77 is established, whereby pressurized air is applied to the pressure switch 73 to confirm engagement between the key-way 18 of the tool T and the movable key 65.

Figure 6:
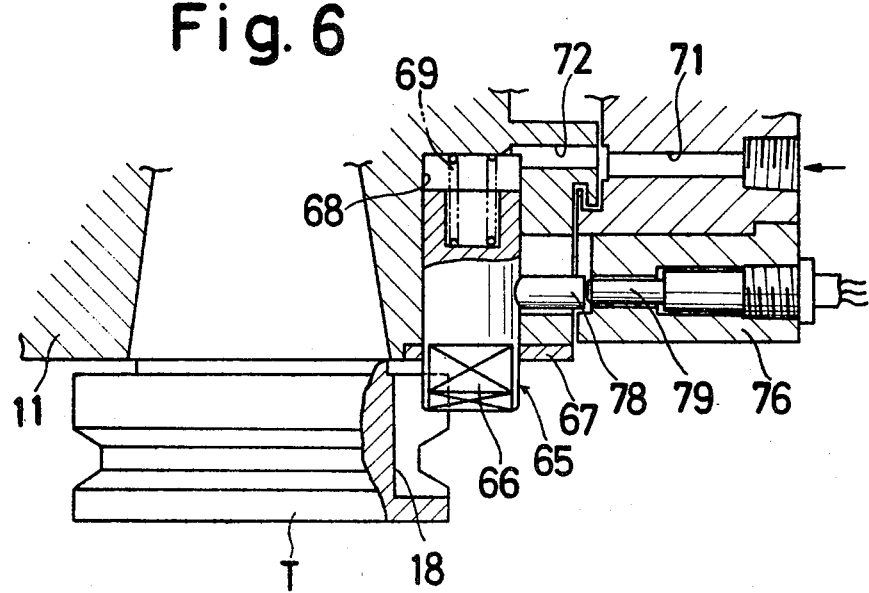
FIG. 6 shows a modified key engagement confirming device.

A modification for confirmation of engagement between the key-way 18 of the tool T and the movable key 65 is shown in FIG. 6. A dog 78 is projected radially from the movable key 65 within the cover plate 76, and a proximity switch 79 responsive to the dog 78 is provided in the cover plate 76.

Figure 7:
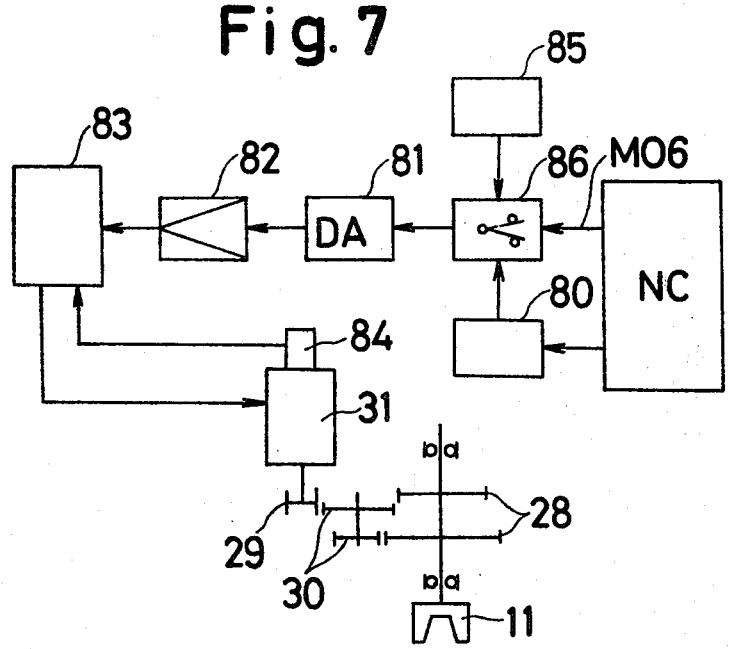
FIG. 7 is a block diagram showing an electric control circuit for controlling a spindle drive motor.

Referring now to FIG. 7, the spindle drive motor 31 is controlled to be rotated at a speed depending upon any of the various tools inserted in the spindle 11. When a rotational speed command (S-code) is applied from a numerical control device NC to a register 80, the speed command is converted by a digital to analog converter 81 into a corresponding voltage which is, in turn, applied as a speed command voltage to a motor drive circuit 83 through an amplifier 82. The actual rotational speed of the drive motor 31 is detected by a speed detector 84, and the detected actual speed is feedbacked to the motor drive circuit 83. Accordingly, the rotational speed of the drive motor 31 is controlled in such a manner that the detected actual rotational speed becomes equal to the commanded rotational speed. When a d.c. motor is used as the drive motor 31, a thyristor Leonard device is used as the motor drive circuit 83. When an a.c. motor is used as the drive motor 31, a variable frequency inverter device is used as the motor drive circuit 83.

In order to perform a tool change operation, it is necessary to reduce a rotational speed of the spindle 11 from a speed depending upon any of various tools to a predetermined low speed such as several tens rpm. A setting device 85 for setting such predetermined low speed command is connected to the digital to analog converter 81 through a switching circuit 86. When the numerical control device NC generates a tool change command MO6, the switching circuit 86 applies, instead of a rotational speed command set in the register 80, the predetermined low speed command set in the setting device 85 to the digital to analog converter 81. As a result, the motor drive circuit 83 controls the rotation of the motor 31 so as to rotate the spindle 11 at the set low speed. When engagement between the key-way 18 of the tool T and the movable key 65 is confirmed by the pressure switch 73, the switching circuit 86 is changed over to cause a rotational speed command set in the register 80 to be applied to the digital to analog converter 81, whereby the spindle 11 is rotated at a speed depending upon a tool T inserted therein.

It is to be noted here that the tool T grasped by the tool gripper 13a or 13b of the tool change arm 13 can be forcibly rotated, but is not rotated together with the movable key 65 abutting the end surface of the flange portion of the tool T, since the tool T is gripped by the tool gripper 13a or 13b with a frictional force greater than that caused between the tool T and the movable key 65 abutting the end surface of the flange portion of the tool T. The tool T is rotated only when engagement between the key-way 18 of the tool T and the movable key 65 is established.

In order to make positive engagement between the key-way 18 and the movable key 65 during rotation of the spindle 11, it is necessary to form the front end of the movable key 65 in a tapered shape or to provide a gap or play between the keyway 18 and the movable key 65. A minimum gap l(mm) is obtained from the following equation:

$$l = 2\pi r \cdot N/60 \cdot t$$

where N(rpm) is rotational speed of the spindle 11; r(mm) is a distance between the movable key 65 and the axis of the spindle 11; and t(sec) is a time required for the movable key 65 to be inserted into the key-way 18.

For example, l is about 4.5 mm where N=150 rpm; r=30 mm; and t=1/100 sec. In this particular embodiment, the widths of the key-way 18 and the engaging head 66 of the movable key 65 have been set to be 16 mm and 10 mm, respectively, so as to provide a gap of 6 mm therebetween.

If the width of the movable key is made narrower, engagement between the key-way 18 and the movable key 65 becomes easier, however, the strength of the movable key 65 is lowered. Accordingly, a half of the width of the key-way 18 is considered to be proper as a maximum gap l max.

Furthermore, it is preferable to perform surface treatment for the wear proof on the front end and side surfaces of the movable key 65 which are in sliding engagement with the tool T.

The operation of the machine tool with an automatic tool change function according to the present invention will be now described. The spindle 11 is usually rotated within a wide range from 20 to 3,000 rpm, and the shiftable gear 30 is operated at the intermediate of such range to change the reduction gear ratio. For example, the shiftable gear 30 is shifted to a low speed range when the rotational speed is lower than 1,100 rpm, and to a high speed range when the rotational speed is higher than 1,100 rpm. Accordingly, frequency in use at the low speed range is higher in usual machining operations, so that the shiftable gear 30 is hereunder assumed to be shifted to the low speed range for convenience of description.

Upon completion of a machining operation by a predetermined tool, the spindle 11 continues to rotate at a high speed depending upon a rotational speed command set in the register 80. The spindle head 10 is moved upward to its upper end position for a tool change operation. When the tool change command MO6 is generated from the numerical control device NC, the switching circuit 86 is changed over to apply a rotational speed command set in the setting device 85. Accordingly, the drive motor 31 is applied with an electrical braking torque so as to rotate the spindle 11 at a predetermined low speed suitable for key engagement. Thereafter, the tool change arm 13 is rotated to grip by the tool grippers 13a and 13b thereof the tools T held in the vertically oriented tool socket 16 and the spindle 11. The unclamping cylinder 24 is subsequently operated to move the drawing rod 22 downwardly against the springs 23, thereby unclamping the tool T held in the spindle 11. When the spindle 11 is rotated to a predetermined position shown in FIG. 3, where the proximity switch 34 is changed from OFF to ON state, pressurized fluid is supplied to the upper chamber of the cylinder 44 to move the tool change arm 13 downwardly, thereby withdrawing the tools T from the spindle 11 and the tool socket 16. The key-way 18 of the tool T is disengaged from the movable key 65 of the spindle 11 by such withdrawal of the tool T from the spindle 11, whereby rotation of the tool T withdrawn from the spindle 11 is immediately stopped by the grip force of the tool change arm 13. Accordingly, the key-way 18 of the tool T grasped by the tool change arm 13 is maintained at a substantially predetermined angular position.

When the tool change arm 13 is moved to its lower end position, the piston 49 is moved, with movement of the inner cylinder 50 being restrained, to rotate the tool change arm 13 by 180 degrees. Subsequently, pressurized fluid is supplied to the lower chamber of the cylinder 44 to move the tool change arm 13 upwardly, whereby the tool T withdrawn from the tool socket 16 is inserted into the tapered bore 11a of the spindle 11, while the tool withdrawn from the spindle 11 is inserted into the tool socket 16. In this manner, since the tool T is withdrawn from the spindle 11 at the timing when the spindle 11 is rotated into the predetermined angular position, the tool T is returned to the tool socket 16 in such a manner that the key-way 18 of the tool T is engaged with the detent pin 16a of the tool socket 16 with some play. Accordingly, a large diameter tool with a radially projected cutter is prevented from interference with an adjacent tool on the tool magazine 15.

When the tool T is inserted into the tapered bore 11a of the spindle 11, the movable key 65 of the spindle 11 is temporarily moved inwardly against the spring 69 by the flange portion of the tool T. However, since the spindle 11 is rotated at the predetermined low speed, the movable key 65 is moved outwardly into engagement with the key-way 18 of the tool T by the force of the spring 69 and pressurized air at the moment when the movable key 65 is rotated into face to face relationship with the key-way 18. Accordingly, rotation of the spindle 11 is transmitted through the movable key 65 to the tool T to forcibly rotate the same within the tool gripper 13a of the tool change arm 13.

Simultaneously with this, the passage 75 is disconnected from the passage 77, but connected with the passage 72, whereby pressurized air is supplied to the pressure switch 73 to actuate the same. With the pressure switch 73 being actuated and the tool change arm 13 being moved to its upward end position, key engagement is confirmed. The confirmation of key engagement causes the unclamping cylinder 24 to be deactivated to thereby release the urging force of the drawing rod 22. Accordingly, the tool T is clamped on the spindle 11 by means of the springs 23. Subsequently, the tool change arm 13 is rotated back to its ready position, thereby completing a tool change operation. With the tool change operation being completed, the tool change command is cancelled so that the switching circuit 86 renders a command signal from the setting device 85 inoperative and a command signal from the register operative. The spindle 11 is thus rotated at a high speed depending upon a newly inserted tool for a next machining operation.

In the above-described embodiment, the tool change arm is used as a tool support device. However, the present invention can be applied to a machine tool wherein tools are directly changed between the tool magazine and the spindle. In such a case, the tool magazine is used as the tool support device.

As described above, according to the present invention, a tool change operation is carried out while the splindle is rotated. Therefore, there is no need to provide a device to stop the spindle at a predetermined angular position, as in the conventional apparatus, whereby a tool change time is considerably shortened, resulting in increase of the machining efficiency.

Furthermore, according to the present invention, a tool is removed from the rotating spindle in response to a signal confirming the predetermined angular position of the spindle, whereby the key-way of a tool returned from the spindle to the tool magazine is maintained at a substantially predetermined angular position. These arrangement and control are particularly effective for large sized tools.

Obviously, numerous modifications and variation of the present invention are possible in light of the above teachings. It is to be understood, therefore, that within the scope of the appended claims, the invention may be practiced otherwise than as specifically described herein.

What is claimed is:

1. In a machine tool with an automatic tool change function having a tool spindle rotatably supported and capable of receiving a tool at one end thereof, the improvement comprising:

tool support means for rotatably supporting at least one tool to selectively insert and remove the same into and from said tool spindle;

a movable key movably guided in said spindle and having a width smaller than that of a key-way formed on said tool;

means for urging said movable key beyond the one end of said spindle;

first control means responsive to a tool change command for rotating said spindle at a predetermined speed permitting key-engagement;

operating means for causing relative movement between said tool support means and said spindle for a tool change operation with said spindle being rotated at the predetermined speed;

detecting means for detecting movement of said movable key to confirm engagement of said movable key with the key-way of said tool;

clamp means responsive to said detecting means for clamping said tool inserted into said spindle;

second control means for rendering said first control means inoperative and for rotating said spindle at a commanded machining speed after said tool is clamped relative to said spindle.

2. A machine tool as claimed in claim 1, further comprising means for preventing rotation of said movable key relative to said spindle.

3. A machine tool as claimed in claim 1, wherein said detecting means comprises a pressure switch actuatable when said movable key is engaged with the key-way of said tool.

4. A machine tool as claimed in claim 1, wherein said detecting means comprises a proximity switch actuatable when said movable key is engaged with the key-way of said tool.

5. A machine tool as claimed in any one of claims 1 to 4, further comprising a tool magazine for removably supporting a plurality of tools, and wherein said tool support means comprises a tool change arm rotatable and movable in a direction parallel to the axis of said spindle, said tool change arm being provided with at least one tool gripper capable of rotatably supporting said tool.

6. A machine tool as claimed in claim 5, further comprising means for comfirming that said spindle has reached a predetermined angular position during rotation thereof at the predetermined speed, and wherein said operating means comprises means responsive to said confirming means for causing relative movement between said tool support means and said spindle in a direction parallel to the axis of said spindle to remove said tool from said spindle.

7. A machine tool as claimed in claim 6, wherein said confirming means comprises:

a dog member secured to said spindle and having a projection with a predetermined angular distance; and a proximity switch responsive to the projection of said dog member.

8. In a machine tool with an automatic tool change function having a tool spindle rotatably supported and capable of receiving a tool at one end thereof, the improvement comprising:

tool support means for rotatably supporting at least one tool to selectively insert and remove the same into and from said tool spindle;

a key member provided on said spindle and engageable with a key-way formed on said tool;

control means responsive to a tool change command for rotating said spindle at a predetermined speed permitting key-engagement;

operating means for causing relative movement between said tool support means and said spindle for a tool change operation with said spindle being rotated at the predetermined speed;

means for confirming that said spindle has reached a predetermined position during rotation thereof at the predetermined speed; and means included in said operating means and responsive to said confirming means for causing relative movement between said tool support means and said spindle in a direction parallel to the axis of said spindle to remove said tool from said spindle.

9. A machine tool as claimed in claim 8, further comprising a tool magazine for removably supporting a plurality of tools, and wherein said tool support means comprises a tool change arm rotatable and movable in a direction parallel to the axis of said spindle, said tool change arm being provided with at least one tool gripper capable of rotatably supporting said tool.

10. A machine tool as claimed in claim 6 or 9, wherein said tool magazine comprises a plurality of tool sockets for removably supporting a plurality of tools, each of said tool sockets being provided with a detent member engageable with the key-way of each tool.

* * * * *